United States Patent
Mao et al.

(10) Patent No.: US 9,703,124 B2
(45) Date of Patent: Jul. 11, 2017

(54) FARADAY ROTATOR MIRROR

(71) Applicant: Oplink Communications, LLC, Fremont, CA (US)

(72) Inventors: Hongwei Mao, Fremont, CA (US); Daxin Chen, Zhuhai (CN); Linhu Li, Feilongzhen (CN); Jinyuan Qiao, Cupertino, CA (US); Tanbin He, Zhuhai (CN); Zexiong Zhao, Zhuhai (CN); Feng Qing Zhou, San Jose, CA (US)

(73) Assignee: Oplink Communications, LLC, Fremont, CA (US)

( * ) Notice: Subject to any disclaimer, the term of this patent is extended or adjusted under 35 U.S.C. 154(b) by 51 days.

(21) Appl. No.: 14/548,670

(22) Filed: Nov. 20, 2014

(65) Prior Publication Data

US 2015/0146291 A1    May 28, 2015

Related U.S. Application Data

(60) Provisional application No. 61/907,889, filed on Nov. 22, 2013.

(51) Int. Cl.
*G02B 5/30* (2006.01)
*G02B 27/28* (2006.01)
*G02F 1/01* (2006.01)

(52) U.S. Cl.
CPC ......... *G02F 1/0136* (2013.01); *G02B 27/286* (2013.01)

(58) Field of Classification Search
CPC ............. G02F 1/0136; G02F 1/133536; G02F 2001/133531; G02B 27/286; G02B 5/3025; G03F 7/70566; G03F 7/70966
(Continued)

(56) References Cited

U.S. PATENT DOCUMENTS

| 2003/0007130 A1* | 1/2003 | Maximus | H04N 9/3117 353/20 |
| 2003/0091261 A1* | 5/2003 | Wu | G02B 6/2706 385/11 |
| 2003/0103718 A1* | 6/2003 | Chen | G02F 1/093 385/22 |

FOREIGN PATENT DOCUMENTS

EP    2579088    4/2013

OTHER PUBLICATIONS

Drexler, P. et al. Utilization of Faraday Mirror in Fiber Optic Current Sensors and Experiments. Progress in Electromagnetics Research Symposium. Beijing, China. Published Mar. 2009. pp. 137-141.

* cited by examiner

*Primary Examiner* — Scott J Sugarman
*Assistant Examiner* — Mustak Choudhury
(74) *Attorney, Agent, or Firm* — Jeffrey K. Jacobs

(57) ABSTRACT

Methods, systems, and apparatus for optical communications. One of the apparatuses comprises a birefringent crystal configured to separate an incoming light beam input at a first port into component light beams having orthogonal polarization directions and directing the component light beams on respective paths to exit locations on the birefringent crystal; and a Faraday rotator positioned between the birefringent crystal and a beam folding optic assembly, wherein the Faraday rotator is positioned such that light beams exiting the birefringent crystal along a first path from a first exit location pass through the Faraday rotator before being incident on the beam folding optic assembly and that light beams exiting the birefringent crystal along a second path from a second exit location pass directly to the beam folding optic assembly without being incident on the Faraday rotator.

12 Claims, 2 Drawing Sheets

(58) Field of Classification Search
USPC ...... 359/484.02, 485.05, 494.01; 385/11, 12,
385/15, 24, 37; 324/96; 349/9; 362/19
See application file for complete search history.

FARADAY ROTATOR MIRROR

CROSS-REFERENCE TO RELATED APPLICATIONS

This application claims the benefit under 35 U.S.C. §119 (e) of the filing date of U.S. patent application No. 61/907,889, for "Faraday Rotator Mirror," which was filed on Nov. 22, 2013, and which is incorporated here by reference.

BACKGROUND

This specification relates to optical communications.

A conventional Faraday rotator is an optical device that rotates the polarization of light signals in the presence of a magnetic field. Faraday rotators are typically used in many different optical communications applications including fiber-optic Michelson Interferometers, laser amplifiers, sensors, and to compensate for induced birefringence in optical fibers.

SUMMARY

In general, one innovative aspect of the subject matter described in this specification can be embodied in apparatuses that include a birefringent crystal configured to separate an incoming light beam input at a first port into component light beams having orthogonal polarization directions and directing the component light beams on respective paths to exit locations on the birefringent crystal; and a Faraday rotator positioned between the birefringent crystal and a beam folding optic assembly, wherein the Faraday rotator is positioned such that light beams exiting the birefringent crystal along a first path from a first exit location pass through the Faraday rotator before being incident on the beam folding optic assembly and that light beams exiting the birefringent crystal along a second path from a second exit location pass directly to the beam folding optic assembly without being incident on the Faraday rotator.

The foregoing and other embodiments can each optionally include one or more of the following features, alone or in combination. The apparatus further includes a collimator optically coupled between the birefringent crystal and an optical fiber, wherein light beams enter and exit the apparatus through the optical fiber. The beam folding optic assembly folds light beams incident along the first path to the reverse of the second path and wherein the beam folding optic assembly folds light beams incident along the second path to the reverse of the first path. The Faraday rotator rotates incident light beams by substantially 90 degrees. The birefringent crystal provides Faraday rotation angle filtering to provide suppression of error in the Faraday rotator.

In general, one innovative aspect of the subject matter described in this specification can be embodied in apparatuses that include a polarization beam splitter configured to separate an incoming light beam input at a first port into component light beams having orthogonal polarization directions and directing the component light beams to respective second and third ports of the polarization beam splitter; a Faraday rotator positioned between the polarization beam splitter and a first folding mirror such that light beams exiting the second port of the polarization beam splitter are directed through the Faraday rotator to the first folding mirror, and wherein the first folding mirror directs incident light beams from the Faraday rotator to a second folding mirror; and the second folding mirror positioned between the polarization beam splitter and the first folding mirror such that light beams exiting the third port of the polarization beam splitter are reflected by the second folding mirror to the first folding mirror, and wherein first folding mirror directs incident light beams from the second folding mirror to the Faraday rotator.

The foregoing and other embodiments can each optionally include one or more of the following features, alone or in combination. The apparatus further includes a collimator optically coupled between the polarization beam splitter and an optical fiber, wherein light beams enter and exit the apparatus through the optical fiber. The first and second folding mirrors fold light beams incident along the first path from the second port of the polarization beam splitter to the reverse of the second path and wherein the first and second folding mirrors fold light beams incident along the second path from the third port of the polarization beam splitter to the reverse of the first path. The Faraday rotator rotates incident light beams by substantially 90 degrees. The of the polarization beam splitter provides Faraday rotation angle filtering to provide suppression of error in the Faraday rotator.

In general, one innovative aspect of the subject matter described in this specification can be embodied in methods that include the actions of receiving a light beam, the components of the light beam having random polarization directions; separating the light beam into a first beam and a second beam, the first beam following a first path and the second beam following a second path, wherein the first beam and the second beam have orthogonal polarization directions; rotating the polarization direction of the first beam and then reflecting the first beam back along the second path; reflecting the second beam back along the first path and then rotating the polarization direction of the second beam; combining the first beam and the second beam such that the first beam and the second beam have orthogonal polarization directions, providing suppression of error in the rotation of the polarization direction of the first and second beams; and outputting the combined beam.

The foregoing and other embodiments can each optionally include one or more of the following features, alone or in combination. The method can include collimating the received light beam before separating the light beam into a first beam and a second beam. The light separating is performed by passing the light beam through a birefringent crystal. The light separating is performed by passing the light beam through a polarization beam splitter. The rotating the polarization direction is performed by passing the first beam through a Faraday rotator.

Particular embodiments of the subject matter described in this specification can be implemented so as to realize one or more of the following advantages. Faraday rotator mirror structures are provided that are temperature insensitive and provide a flat wavelength response.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A Faraday rotator is intended to provide a specified rotation of a polarization direction of incident light beams. In many optical communications applications, there needs to be a very accurate Faraday rotation angle. For example, in a fiber-optic interferometer, Faraday rotator mirrors are used to eliminate interference signal fluctuations due to random polarization direction changes in the optical fibers. The exact rotation provided by a conventional Faraday rotator can vary due to temperature and wavelength changes. This specification describes different Faraday rotator mirror apparatuses that provide suppression of error in the Faraday rotator to provide a substantially consistent polarization output regardless of temperature or wavelength.

Figure 1:
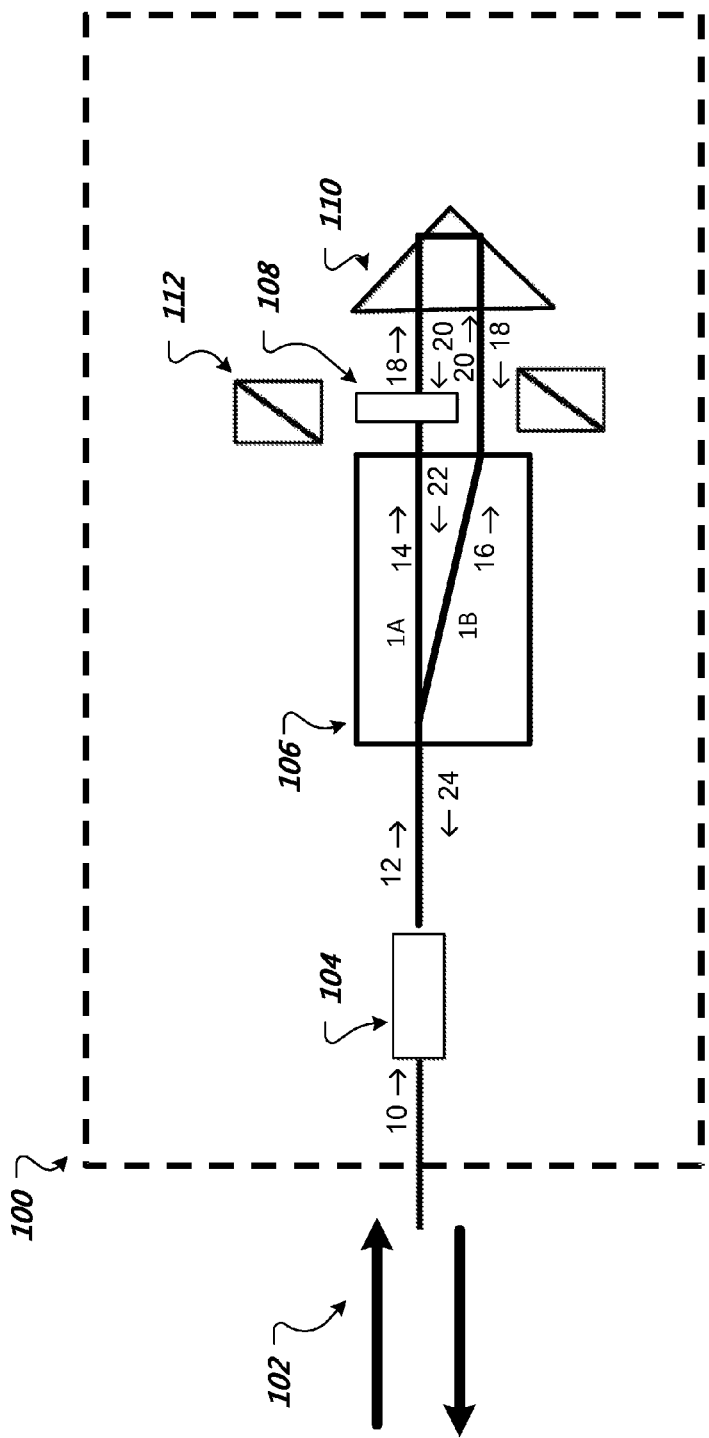
FIG. 1 is a block diagram of an example Faraday rotator mirror.

FIG. 1 is a block diagram of an example Faraday rotator mirror 100. The Faraday rotator mirror 100 is coupled to an optical fiber 102. Light beams, for example carrying one or more wavelengths used for optical communications, enter and exit the Faraday rotator mirror 100 through the optical fiber 102. In particular, the optical fiber 102 is optically coupled to a first end of a collimator 104 of the Faraday rotator mirror 100. The collimator 100 aligns an incoming light beam. A second end of the collimator 104 is optically coupled to a birefringent crystal 106. The birefringent crystal 106 is optically coupled to a prism 110.

The Faraday rotator mirror 100 also includes a Faraday rotator 108 positioned between the birefringent crystal 106 and the prism 110. The Faraday rotator 108 is positioned between the birefringent crystal 106 and the prism 110 such that only one light path exiting from the birefringent crystal 106 is incident on the Faraday rotator 108 prior to entering the prism 110.

The Faraday rotator 108 is also positioned within a magnetic field generating element 112. The magnetic field generating element 112 can include, for example, a wire coil wound onto a circular iron core. An electrical current can be applied to the coil to generate a magnetic field. Alternatively, magnetic field generating element 112 can be a permanent circular shaped magnet. In some other implementations, any suitable magnetic field generating structure can be used. The applied magnetic field from the magnetic field generating element 112 causes the polarization of a light beam passing through the Faraday rotator 108 to be rotated by a specified amount. In particular, the Faraday rotator 112 can rotate the polarization of an incident light beam by substantially 90 degrees.

In operation, a light beam 10 is input from the optical fiber 102 to the collimator 104 of the Faraday rotator mirror 100. The collimator 104 is configured to align incoming light to the same direction e.g., to form substantially parallel light.

The incoming light beam 10 can have random polarization directions. Light beams are formed of electromagnetic waves having varying electric and magnetic fields that oscillate in directions perpendicular to the direction of propagation. The polarization direction of a particular light wave in the beam corresponds to a direction parallel to the electrical field of the light wave. The incoming light beam is formed of many light waves having different polarization directions. Randomly polarized light can be described with respect to the component magnitude along orthogonal axes. In particular a Jones vector form can be used to describe the respective magnitude components of the electric field along the orthogonal axes as well as a phase component describing a phase retardation along the orthogonal axes.

The light beam 12 exiting the second end of the collimator 104 enters a first side of the birefringent crystal 106. The birefringent crystal 106 separates the incoming light beam having random polarization directions into two separate light beams having orthogonal polarization directions relative to each other, commonly referred to as an "ordinary" beam 14 and an "extraordinary" beam 16. In addition to separating the light beams by polarization direction, the two separate light beams also diverge due to the nature of the birefringent crystal 106.

The ordinary beam 14 has a first polarization direction and follows a first path 1A through the birefringent crystal 106. The ordinary beam 14 exits the birefringent crystal 106 at a first exit location at a second end of the birefringent crystal 106. The ordinary beam 14 is then incident on the Faraday rotator 108. The polarization direction of the ordinary beam 14 is rotated such that the polarization direction is rotated by substantially 90 degrees upon exiting the Faraday rotator 108 to form rotated beam 18.

The extraordinary beam 16 has a second polarization direction that is orthogonal to the first polarization direction of the ordinary beam 14, and follows a second path 1B through the birefringent crystal 106. The extraordinary beam 16 exits the birefringent crystal 106 at a second exit location at the second end of the birefringent crystal 106 as beam 20.

The prism 110 is configured to fold the path of incident light beams back along the incident direction but spatially displaced. Other suitable folding optics, e.g., mirrors, can be used. In particular, each of the rotated beam 18 and the beam 20 are incident at positions on the prism 110 such that they are folded back along the path of each other. Thus, the rotated beam 18 exits the prism 110 at the location in which the beam 20 enters the prism 110 and the beam 20 exits the prism 110 at the location in which the rotated beam 18 enters the prism 110.

After exiting the prism 110, the beam 20 follows the reverse path of the rotated beam 18 through the Faraday rotator 108. The polarization direction of the beam 20 is rotated such that the polarization direction is rotated by substantially 90 degrees upon exiting the Faraday rotator 108 to form rotated beam 22. Rotated beam 22 then enters the birefringent crystal 106 at the first exit location at the second end of the birefringent crystal 106 and follows the first path 1A through the birefringent crystal 106. Since the rotated beam 22 has a rotated polarization direction that is now the same as the initial ordinary beam 14, it directly follows the first path 1A in the opposite direction as the ordinary beam 14.

The rotated beam 18 follows the reverse path of the beam 20 after exiting the prism 110. The rotated beam 18 enters the birefringent crystal 106 at the second exit location at the second end of the birefringent crystal 106 and follows the second path 1B through the birefringent crystal 106. In particular, since the rotated beam 18 has a rotated polarization direction that is now the same as the initial extraordinary beam 16, it directly follows the second path 1B in the opposite direction as the extraordinary beam 16.

Thus, a loop is formed that routes light beams separated by the birefringent crystal 106 back along the path of each other. In particular, the ordinary beam 14 separated by the birefringent crystal 106 is looped back to the path of the extraordinary beam 16. Similarly, the extraordinary beam 16 is looped back to the path of the ordinary beam 14. Additionally, while the polarization directions remain orthogonal, the polarization directions of the ordinary beam 14 and the extraordinary beam 16 are switched upon their return to the birefringent crystal 106.

A combined beam 24 exits the birefringent crystal 106 at the first location on the first side of the birefringent crystal 106, passes through the collimator 104, and exits the Faraday rotator mirror 100 though the optical fiber 102. The combined beam 24 has orthogonal polarization directions.

The birefringent crystal 106 acts as a Faraday rotation angle filter. A Faraday rotator may not always rotate incoming light beams by exactly 90 degrees. In particular, many Faraday rotators exhibit temperature and wavelength dependence. For example, as temperature increases, the rotation angle can decrease. However, the operating temperature is typically not constant. Similarly, the rotation angle of a Faraday rotator is dependent upon a proportionality constant for the material of the rotator. However, this constant also varies with wavelength. The birefringent crystal 106, however, only passes components of the light beams to the exit path that are rotated by 90 degrees. In particular, only components of light beams that have a polarization direction parallel to or perpendicular to the axis of the birefringent crystal 106, depending the respective beam path, are passed along the exit path from the birefringent crystal 106 to the collimator 104. For example, if a light beam has a polarization direction that is slightly off of perpendicular to the axis of the birefringent crystal, e.g., by 1 degree, due to error of the Faraday rotator, only the perpendicular component of the vector describing the direction of the electric field of the light beam is passed along the beam path to the exit.

Thus, the output light beam has orthogonal polarization directions regardless of any error in the rotation angle of the Faraday rotator caused by changes in temperature or wavelength. Depending on the error of birefringent crystal 106 in passing light beams having precise polarization directions, any error resulting from the Faraday rotator can be greatly suppressed. For example, if the error of the birefringent crystal 106 is 40 dB, a 10000× suppression of the Faraday rotation error can be achieved.

Figure 2:
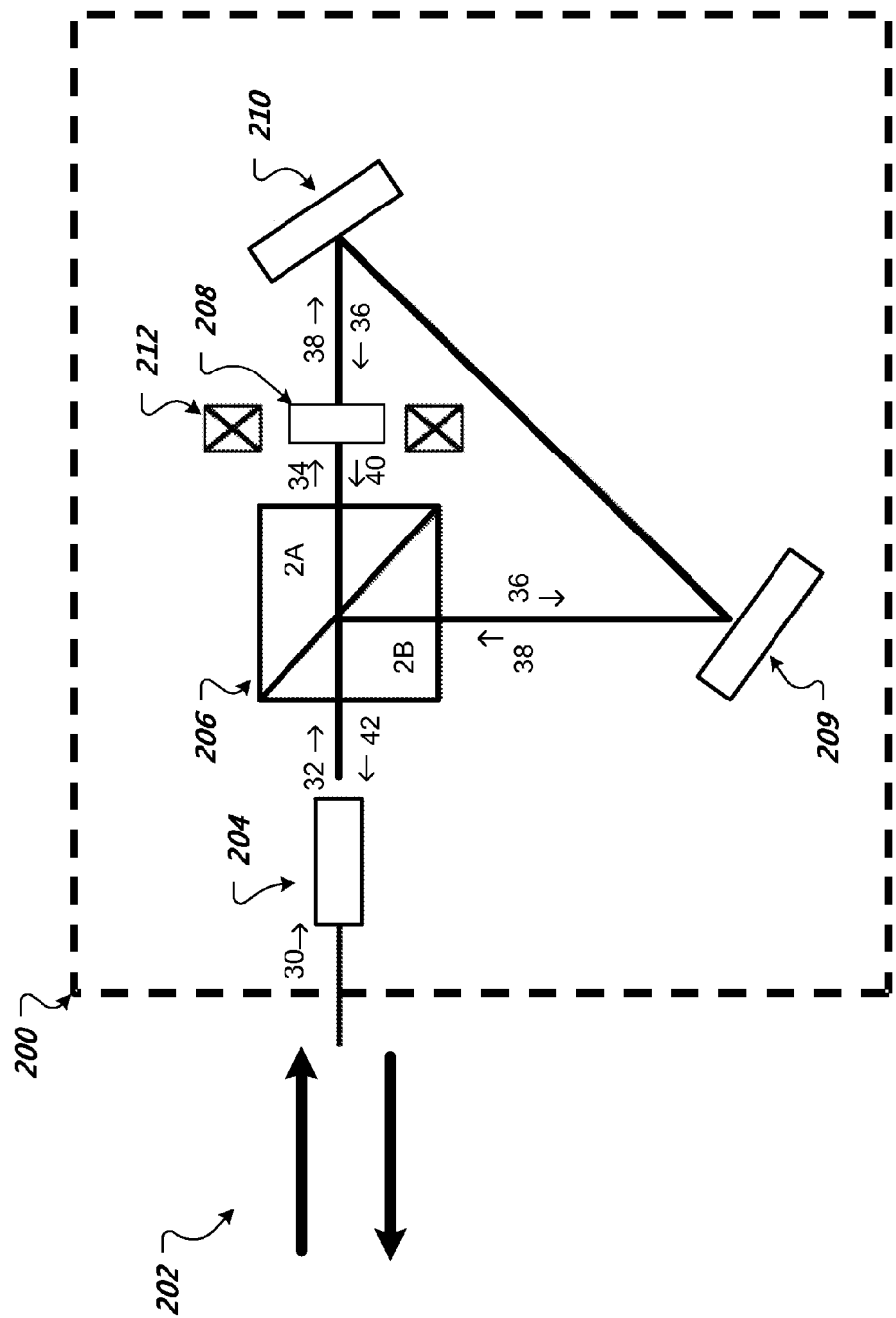
FIG. 2 is a block diagram of another example Faraday rotator mirror.

FIG. 2 is a block diagram of another example Faraday rotator mirror 200. The Faraday rotator mirror 200 is coupled to an optical fiber 202. Light beams, for example carrying one or more wavelengths used for optical communications, enter and exit the Faraday rotator mirror 200 through the optical fiber 202. In particular, the optical fiber 202 is optically coupled to a first end of a collimator 204 of the Faraday rotator mirror 200. A second end of the collimator 204 is optically coupled to a polarization beam splitter 206. The polarization beam splitter 206 is optically coupled to folding mirrors 209 and 210.

The Faraday rotator mirror 200 also includes a Faraday rotator 208 positioned between a first output port of the polarization beam splitter 206 and the folding mirror 210. The Faraday rotator 208 is also positioned within a magnetic field generating element 212. The magnetic field generating element 212 can include, for example, a wire coil wound onto a circular iron core. An electrical current can be applied to the coil to generate a magnetic field. Alternatively, magnetic field generating element 212 can be a permanent circular shaped magnet. In some other implementations, any suitable magnetic field generating structure can be used. The applied magnetic field from the magnetic field generating element 212 causes the polarization of a light beam passing through the Faraday rotator 208 to be rotated by a specified amount. In particular, the Faraday rotator 212 can rotate the polarization of an incident light beam by 90 degrees.

In operation, a light beam 30 is input from the optical fiber 202 to the collimator 204 of the Faraday rotator mirror 200. The collimator 204 is configured to align incoming light to the same direction e.g., to form substantially parallel light. The incoming light beam 30 can have random polarization directions.

The light beam 32 exiting the second end of the collimator 204 enters a first port of the polarization beam splitter ("PBS") 206. The PBS 206 passes light beams having a first polarization direction while reflecting beams having an orthogonal polarization direction. In particular, the PBS 206 can be formed of two prisms joined at an angle such that light beams having a first polarization direction pass directly through the PBS 206 while light beams having the orthogonal polarization direction are directed based on the angle at which the two prisms are joined.

In particular, the light beam 32 entering the PBS 206 at the first port is separated into component light beams having orthogonal polarizations. The component of the light beam 32 having a first polarization direction passes through the PBS 206 along path 2A and exits the PBS 206 at a second port as light beam 34. The component of the light beam 32 having a second polarization direction, orthogonal to the first polarization direction, is reflected along a second path 2B in the PBS 206 and exits the PBS 206 at a third port as light beam 36.

Light beam 34 passes through the Faraday rotator 208 and exits as rotated beam 38. The rotated beam 38 has a polarization direction that has been rotated by substantially 90 degrees from the polarization direction of light beam 34. The rotated beam 38 is reflected by folding mirror 210, which directs the light beam 34 to folding mirror 209. Folding mirror 209 reflects the rotated beam 38 to enter the third port of the PBS 206. The rotated beam 38 follows path 2B through the PBS 206. Since the rotated beam 38 has had the polarization rotated by substantially 90 degrees, it is now substantially reflected by the PBS 206 along the path to the first port. This light path forms a loop through the Faraday rotator mirror 200 in a first direction.

Light beam 36 exiting from the third port of the PBS 206 is incident on the folding mirror 209, which reflects the light beam 36 to the folding mirror 210. The folding mirror 210 directs the light beam 34 to the Faraday rotator 208. The Faraday rotator 208 rotates the polarization direction of the light beam 34, which exits the Faraday rotator 208 as rotated beam 40. Rotated beam 40 then enters the PBS 206 at the second port and follows path 2A. Since the rotated beam 40 has had the polarization rotated by substantially 90 degrees, it now substantially passes through the PBS 208, combining with the rotated beam 38 reflected by the PBS 206, to exit the first port as combined beam 42. This light path follows the same loop through the Faraday rotator mirror 200 in a second, opposite, direction.

The combined beam 42 has components having orthogonal polarization directions. The combined beam 42 passes back through the collimator 204 and exits the Faraday rotator mirror 200 through the optical fiber 202.

The PBS 208 also acts as a Faraday rotation angle filter. The PBS 208 only passes components of the light beams to the exit path that are rotated by 90 degrees. In particular, only components of light beams that have a polarization direction parallel to or perpendicular, relative to the PBS 208 and the respective beam path, are passed out of the first port of the PBS 208 to the collimator 204. For example, if a light beam entering the third port of the PBS 208 along path 2B has a polarization direction that is slightly off of perpendicular, e.g., by 1 degree, due to error of the Faraday rotator, only the perpendicular component of the vector describing the direction of the electric field of the light beam is passed along the beam path to the first port of the PBS 208.

Thus, the output light beam has orthogonal polarization directions regardless of any error in the rotation angle of the Faraday rotator caused by changes in temperature or wavelength. Depending on the error of the PBS 208 in passing light beams having precise polarization directions, any error resulting from the Faraday rotator can be greatly suppressed. For example, if the error of the PBS 208 is 40 dB, a 10000× suppression of the Faraday rotation error can be achieved.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. An apparatus comprising: a birefringent crystal configured to separate an incoming light beam input at a first port into component light beams having orthogonal polarization directions and directing the component light beams on respective paths to exit locations on the birefringent crystal; and
    a Faraday rotator positioned between the birefringent crystal and a beam folding optic assembly, wherein the Faraday rotator is positioned such that light beams exiting the birefringent crystal along a first path from a first exit location pass through the Faraday rotator before being incident on the beam folding optic assembly and that light beams exiting the birefringent crystal along a second path from a second exit location pass directly to the beam folding optic assembly without being incident on the Faraday rotator,
    wherein the beam folding optic assembly folds light beams incident along the first path to the reverse of the second path and wherein the beam folding optic assembly folds light beams incident along the second path to the reverse of the first path.

2. The apparatus of claim 1, further comprising a collimator optically coupled between the birefringent crystal and an optical fiber, wherein light beams enter and exit the apparatus through the optical fiber.

3. The apparatus of claim 1, wherein the Faraday rotator rotates incident light beams by substantially 90 degrees.

4. The apparatus of claim 1, wherein the birefringent crystal provides Faraday rotation angle filtering to provide suppression of error in the Faraday rotator.

5. An apparatus comprising:
    a polarization beam splitter configured to separate an incoming light beam input at a first port into component light beams having orthogonal polarization directions and directing the component light beams to respective second and third ports of the polarization beam splitter;
    a Faraday rotator positioned between the polarization beam splitter and a first folding mirror such that light beams exiting the second port of the polarization beam splitter are directed through the Faraday rotator to the first folding mirror, and wherein the first folding mirror directs incident light beams from the Faraday rotator to a second folding mirror; and
    the second folding mirror positioned between the polarization beam splitter and the first folding mirror such that light beams exiting the third port of the polarization beam splitter are reflected by the second folding mirror to the first folding mirror, and wherein first folding mirror directs incident light beams from the second folding mirror to the Faraday rotator,
    wherein the first and second folding mirrors fold light beams incident along the first path from the second port of the polarization beam splitter to the reverse of the second path and wherein the first and second folding mirrors fold light beams incident along the second path from the third port of the polarization beam splitter to the reverse of the first path.

6. The apparatus of claim 5, further comprising a collimator optically coupled between the polarization beam splitter and an optical fiber, wherein light beams enter and exit the apparatus through the optical fiber.

7. The apparatus of claim 5, wherein the Faraday rotator rotates incident light beams by substantially 90 degrees.

8. The apparatus of claim 5, wherein the of the polarization beam splitter provides Faraday rotation angle filtering to provide suppression of error in the Faraday rotator.

9. A method comprising:
    receiving a light beam, the components of the light beam having random polarization directions;
    separating the light beam into a first beam and a second beam, the first beam following a first path and the second beam following a second path, wherein the first beam and the second beam have orthogonal polarization directions;
    rotating the polarization direction of the first beam and then reflecting the first beam back along the second path;
    reflecting the second beam back along the first path and then rotating the polarization direction of the second beam;
    combining the first beam and the second beam such that the first beam and the second beam have orthogonal polarization directions, providing suppression of error in the rotation of the polarization direction of the first and second beams; and outputting the combined beam, wherein the rotating polarization direction is performed by passing the first beam through a Faraday rotator.

10. The method of claim 9, comprising collimating the received light beam before separating the light beam into a first beam and a second beam.

11. The method of claim 9, wherein the light separating is performed by passing the light beam through a birefringent crystal.

12. The method of claim 9, wherein the light separating is performed by passing the light beam through a polarization beam splitter.

* * * * *